United States Patent [19]

Box

[11] Patent Number: 5,073,699

[45] Date of Patent: Dec. 17, 1991

[54] DEVICE FOR WARMING FOOD AND BEVERAGE CONTAINERS HAVING SUPPORT PLATE AND PERIMETER SKIRT STRUCTURE

[75] Inventor: David W. Box, Colorado Springs, Colo.

[73] Assignee: V. Dardanella Austin, Manitou Springs, Colo.

[21] Appl. No.: 342,237

[22] Filed: Apr. 24, 1989
(Under 37 CFR 1.47)

Related U.S. Application Data

[63] Continuation-in-part of Ser. No. 152,863, Feb. 5, 1988, Pat. No. 4,825,046.

[51] Int. Cl.⁵ .............................................. H05B 3/72
[52] U.S. Cl. .................................. 219/433; 219/439; 219/441
[58] Field of Search ............... 219/433, 439, 462, 441, 219/443, 449, 432; 392/442, 467; 126/390

[56] References Cited

U.S. PATENT DOCUMENTS

| | | | |
|---|---|---|---|
| 928,634 | 7/1909 | Cruickshank | 126/215 |
| 1,777,940 | 10/1930 | Stough | 126/390 |
| 2,570,975 | 10/1951 | Osterheld | 219/433 |
| 2,605,382 | 7/1952 | Kircher et al. | 219/433 |
| 2,840,683 | 6/1958 | Butcher | 219/433 |
| 3,294,039 | 12/1966 | Ogden | 219/439 |
| 3,719,796 | 3/1973 | Abildtrup | 219/462 |
| 3,778,594 | 12/1973 | Wightman | 219/430 |
| 4,629,866 | 12/1986 | Proctor | 219/439 |
| 4,825,046 | 4/1989 | Box | 219/433 |
| 4,994,649 | 2/1991 | Roland, Sr. et al. | 219/433 |

Primary Examiner—Bruce A. Reynolds
Assistant Examiner—John A. Jeffery
Attorney, Agent, or Firm—Timothy J. Martin; Dana S. Rewoldt

[57] ABSTRACT

A warming unit for warming a vessel for containing food or beverages, such as a coffee pot for an automatic drip coffee maker, reduces scorching and burning resulting from non-uniform heating of the vessel. The warming device has a support plate with an upper surface dimensioned to support the vessel and a perimeter skirt extending downwardly from a perimeter of the support plate to surround a heating element beneath the support plate. The upper surface includes raised support structures formed as dome-shaped structures thereon. The cooking vessel rests on and is supported by the top surfaces of the support structures in spaced relation to the plate thus creating a convection space which reduces thermal conductive heating and allows both convection heating and infrared heating. The support plate also comprises a thermal mass sufficient to dampen fluxuations of temperature at the upper surface. Vent holes through the top plate and perimeter skirt vent steam and vapors from underneath the support plate and facilitate convective warming of the vessel. An alternative embodiment may be constructed as an interface plate device with a flat plate dimensioned correspondingly to a hot plate of a conventional warming device for insertion between the hot plate and a cooking vessel.

25 Claims, 5 Drawing Sheets

DEVICE FOR WARMING FOOD AND BEVERAGE CONTAINERS HAVING SUPPORT PLATE AND PERIMETER SKIRT STRUCTURE

FIELD OF THE INVENTION

This application is a continuation-in-part of application Ser. No. 152,863 filed Feb. 5, 1988, now U.S. Pat. No. 4,825,046.

The present invention generally relates to hot plates and other electric warming units which support thereon a vessel containing food or beverage to be heated or maintained in a warm condition. The warming device of the present invention is operative to warm a food and beverage vessel without scorching or burning its contents. In comparison with earlier warming devices, the warming device of the present invention acts with reduced heating effects of thermal conduction and increased heating effects from convection and infrared heating upon a vessel. Specifically, this invention is directed to a warming unit of a drip coffee maker which does not scorch liquid coffee after it has been brewed.

BACKGROUND OF THE INVENTION

The use of an electric heating element, in which electric current is used for the resistive heating of a wire, incorporated in a warming unit to provide a heat source with a flat support surface is pervasive in modern kitchen appliances. One problem attendant with such warming units is localized heating phenomena resulting in "hot spots" that occur on the support surface of the heating unit. Since, in the case of conventional warming units, a cooking vessel placed on the support surface is primarily heated by thermal conduction over the base of the cooking vessel, it is not unusual for the base of the cooking vessel to have hot spots corresponding to those on the heating element surface which are at a much greater temperature than the average temperature of the cooking vessel base. Food or beverages contained in the vessel may accordingly become scorched or burned by these localized hot spots.

One particular type of apparatus to which the present invention is specifically directed are hot beverage brewing devices of the drip brew type, especially drip brew coffee makers. These devices encompass, for example, both multiple unit commercial coffee makers used in restaurants and institutional kitchens and single unit drip brew coffee makers currently marketed by a wide variety of manufacturers for home use. The coffee maker industry is of particular interest since there has been a rapid expansion of the use of coffee makers in the home, as well as in restaurants, over the last 20 years. Such coffee makers have, to a large extent, replaced percolating coffee pots, both electric and non-electric.

As is well known, the typical coffee maker includes a housing and a water heating unit which receives water and heats the water to a brewing temperature. This water is conveyed through a coffee-holding filter assembly, wherein the water becomes flavored by the coffee, and is then downwardly dispensed under the influence of gravity into a receiving vessel, preferably in the form of a glass coffee pot. The coffee pot receives and stores the brewed coffee from the coffee maker and traditionally rests on a warming unit, or hot plate, of the coffee maker. Such hot plates may have either a constant temperature heat element, normally operating in a range of 220°-250° F. or, in the alternative, a heat source cyclicaling between an "on" state and an "off" state controlled, for example, by a timer or thermostat whereby the coffee remains at a fairly stable temperature range. Even on the cyclical systems, however, the heat element typically has temperature amplitude with a peak, or maximum, temperature in the "on" state that exceeds 250° F. to compensate for those time periods when the source is in the off state.

Due to localized heating by both steady temperature and the cyclical heating elements, excessive temperatures at localized areas are transmitted by thermal conduction through the base of the containment vessel to that portion of the beverage adjacent thereto. This transmission of excessive heat causes a cooking action within coffee which degenerates attributes of the coffee, such as flavor, aroma, and color. Over a period of time, an increasing portion of the coffee is exposed to the excess temperatures. This is compounded by mixing of the coffee during removal of coffee containing vessel for pouring. Therefore, the stored coffee in the coffee pot becomes increasingly degraded over time.

SUMMARY OF THE INVENTION

It is an object of the present invention to provide a new and useful warming unit which provides a thermal mass that more uniformly distributes heat generated by the heating element of the warming unit.

Another object of the present invention is to provide a warming unit which decreases the amount of heat transferred by thermal conduction while increasing the amount of heat transferred by convection and infrared radiation.

A further object of the present invention is to provide a warming unit for use as a hot plate for coffee pots for use in drip coffee makers wherein the device is simple and inexpensive to manufacture and easy to use. A still further object of the present invention is to provide a warming unit which does not produce localized excessively hot spots on the base of cooking vessels.

Yet another object of the present invention is to provide a warming unit interface device which may be used in combination with conventional warming units, or hot plates, of a wide variety of existing drip coffee makers having either constant temperature or cyclical heat elements so as to maintain brewed coffee in a stored state for consumption without degradation and improve the coffee warming performance of existing coffee makers.

A first embodiment comprising the present invention is directed to a thermal interface device adapted to be inserted between the support surface of a conventional warming unit and a vessel to be heated to improve the performance of existing hot plate units by providing a relatively constant temperature thermal mass and decrease heating of the vessel by conduction while increasing heating of the vessel by convection and radiation. In its broadest form, the first embodiment includes a flat plate formed of heat-conductive material sized to overlay and be supported by a support surface of a warming unit, such as a hot plate or the like. The flat plate has a bottom surface facing the support surface of the warming unit and an upper surface opposite the bottom surface. Raised surface support means, preferably in the form of a plurality of dome-shaped support structures, are located on the upper surface for supporting a cooking vessel in spaced relation to the upper surface whereby the vessel is heated by convection currents and radiation from the flat plate. A layer of adhesive material is preferably provided to cover a bottom surface portion and is operative to adhere the interface device to the support surface of the warming unit. Accordingly, the adhesive material is selected to be able to withstand high temperatures. This adhesive material may conveniently be a glass fiber material preferably formed as double-sided tape.

The dome-shaped support structures on the upper surface of the plate may be created by deformed regions of the flat plate for ease of manufacture. This construction creates a concavity in the bottom surface corresponding to each dome-shaped support structure. The flat plate may also be provided with a plurality of vent holes to allow passage of steam and other vapors therethrough. These vent holes may conveniently be located centrally of each dome-shaped support structure. Furthermore, each dome-shaped support structure may have a flattened top face which defines a support surface for the vessel. The flat plate and raised surface supports of the preferred embodiment are formed of a unitary piece of copper material, but may be fabricated of any other material of suiable thermal conductivity and heat capacity.

This first embodiment of the present invention, then, contemplates the combination of the thermal interface plate, as described above, with an automatic drip coffee maker having a conventional hot plate and a coffee pot which receives and stores brewed coffee from the coffee maker and which has a base normally supported by the support surface of the warming unit such that the brewed coffee is maintained at an elevated temperature for consumption. The interface plate is dimensioned similarly to the support surface of the warming unit of the coffee maker with all of the top faces of the raised supports oriented along a geometric surface complimentary to the shape of the base of the coffee pot.

A second embodiment comprising the present invention is directed to an improved hot plate for a drip coffee maker and comprises a top panel which is formed of heat conducting material and sized to support a coffee containing vessel. The top panel may have a skirt extending downwardly about its perimeter which surrounds a heating element which has an on state, in which the element produces heat energy, and an off state. An upper surface of the top panel has raised dome shaped regions for supporting a beverage containing vessel in spaced relation to the upper surface. Vent holes may be formed both through the upper surface and skirt. A thermostat may also be employed to switch the heating element between its on and off states in response to a temperature change.

Both the interface plate and the hot plate are constructed so that, where the heating element has an operating temperature in the range of 200° to 250° F., which normally holds brewed coffee in the vessel at a holding temperature in excess of 170° F., the holding temperature is reduced to a temperature suitable for consumption less than or equal to 165° F. Where the heating element is cyclically operated, the top plate of the warming unit embodying the present invention is selected to have sufficient heat capacity to be operative to dampen the amplitude of the temperature change of the top support surface such that the maximum temperature of the support surface during the "on" state of the heating element is sufficiently low to avoid burning of the brewed coffee while the brewed coffee is maintained at a sufficiently high temperature for consumption.

These and other objects of the present invention will become more readily appreciated and understood from a consideration of the following detailed description of the preferred embodiment when taken together with the accompanying drawings, in which:

DETAILED DESCRIPTION OF THE PREFERRED EMBODIMENT

Figure 1:
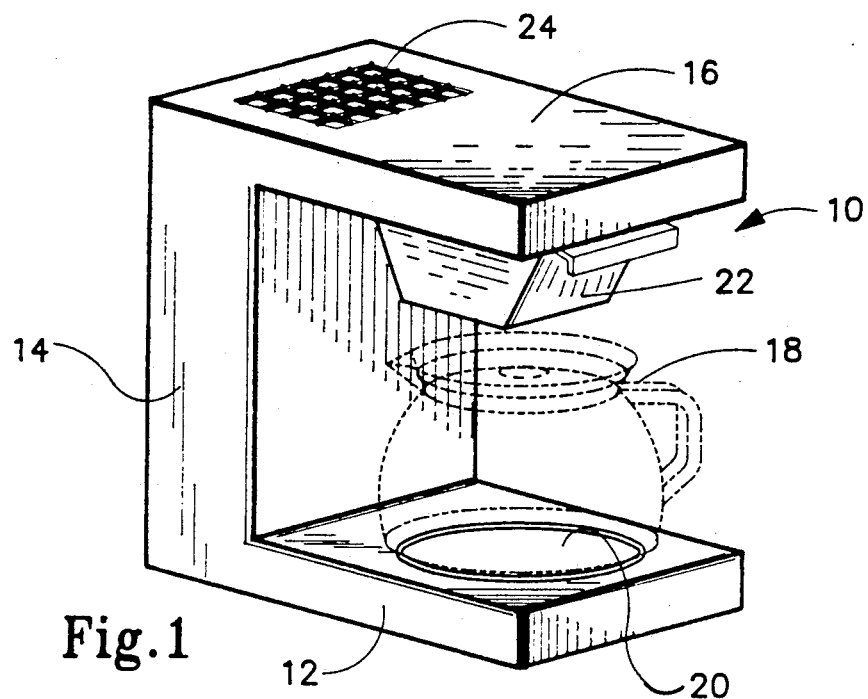
FIG. 1 is a perspective view showing a interface plate embodying the present invention used in combination with a coffee maker and which shows a coffee pot in phantom line.

A thermal interface plate embodying the present invention and adapted to be inserted between a hot plate of a conventional drip coffee maker and a vessel to be heated is shown in FIG. 1. This embodiment of the present invention is operative to convert the heating process from such conventional heating units from one primarily dominated by thermal conduction to a heating process dominated by thermal convection and infrared radiation to reduce burning and scorching effects from localized hot areas on the heating element and to act as a heat sink to smooth out, i.e., dampen, the heating fluxuations of a cyclical heating element. While this embodiment is specifically directed to the hot plate of an automatic drip coffee maker, it should nonetheless be appreciated that the inventive device contained herein may be used with heating appliances other than coffee makers.

As is shown in FIG. 1, automatic drip coffee maker 10 includes a base support 12, an upright section 14 and a top section 16. Base support 12 supportively mounts a hot plate 20 which in turn supports and heats a coffee pot 18, shown in phantom. Top section 16 holds a filter assembly 22 adapted to receive a coffee filter and granulated coffee beans, and a water intake port 24 is located at a rearward portion of top section 16. In use, a measured portion of water is dispensed into water intake port 24 wherein it flows into a holding chamber in upright section 14 to be heated by a brewing element separate from heating element of hot plate 20. This heated water is conveyed by appropriate hot water conduits and discharged from top section 16 into filter assembly 22 after which the hot water passes through the granulated coffee thereby picking up flavor and aroma and drips out of filter assembly 22 into coffee pot 18. After this brewing process is completed, the liquid-brewed coffee may be consumed and, to this end, coffee pot 18 acts as a heating and storing vessel for the brewed coffee. Hot plate 20 maintains the brewed coffee in pot 18 at a holding temperature for consumption.

Figure 2:
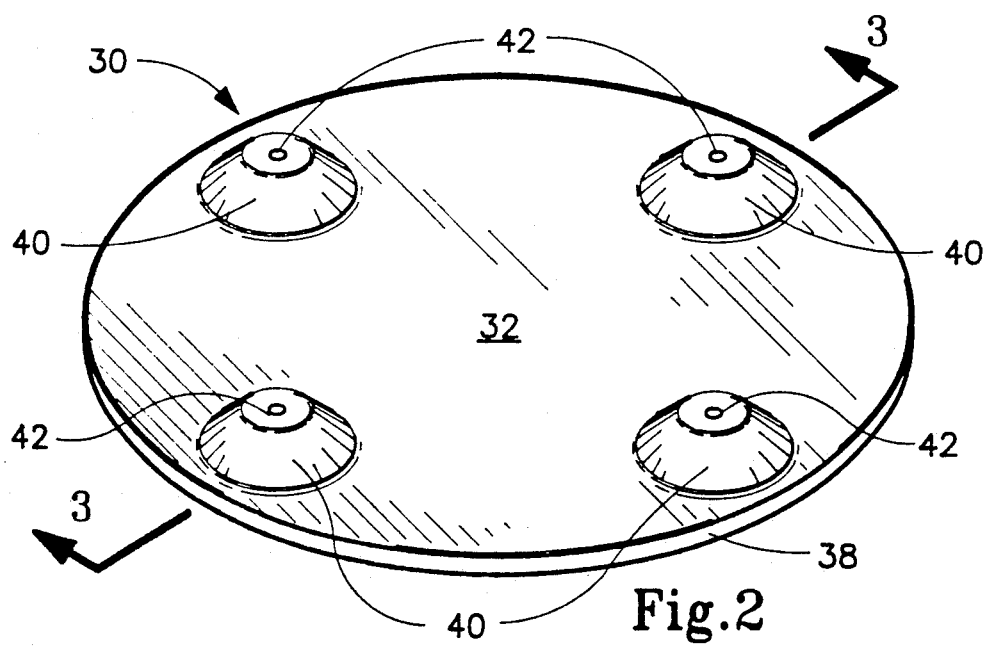
FIG. 2 is a perspective view of the interface plate thermal interface device according to a first embodiment of the present invention.
Figure 3:
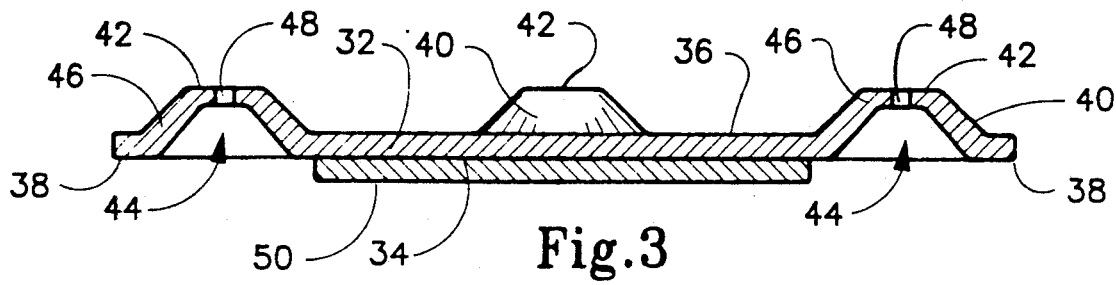
FIG. 3 is a cross sectional view of the interface plate 2 taken about lines III—III of FIG. 2.
Figure 4:
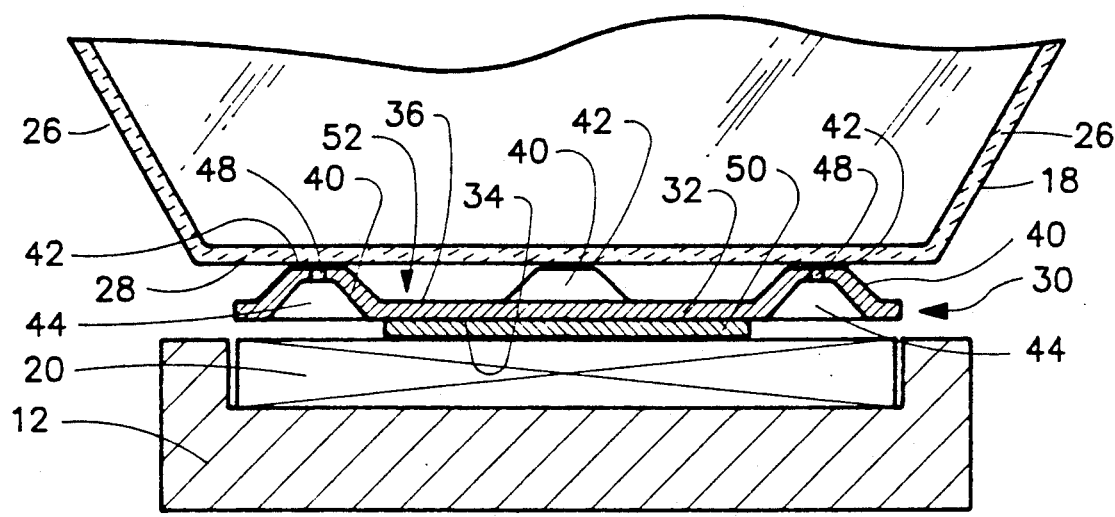
FIG. 4 is a side view partially broken away and in cross section showing the thermal interface plate embodying the present invention interposed between a the support surface of a conventional warming unit and a coffee pot.

Thermal interface plate device 30 embodying the present invention is best shown in FIGS. 2-4 and is adapted to be inserted between a hot plate and a vessel to be heated thereby. Thermal interface device 30 is formed as a flat plate 32 of heat conductive material which, as is shown best in FIG. 4, is dimensioned to overlay heating element 20 and be supported thereby. Preferably, thermal interface plate 30 is formed out of an integral piece of copper material although other heat conducting materials are within the scope of this invention. Flat plate 32 has a bottom surface 34 which faces hot plate 20 when interface plate device 30 is placed thereon. An upper surface 36 is located opposite bottom surface 34 and faces coffee pot 18 when coffee pot 18 is set on interface device 30.

As is shown in FIGS. 2-4, raised surface support means are located on upper surface 36 of interface device 30 in order to support a coffee pot thereon. In the preferred embodiment shown in FIGS. 2 through 4, the raised surface support means includes a plurality of dome-shaped support structures 40 which are preferably frusto-conical in shape and have a flattened top face 42. In the preferred form of the embodiment, four such support structures are provided and are located equiangularly around and spaced from peripheral edge 38 of flat plate 32. As is best shown in FIG. 3 support structures 40 and flat plate 32 are formed as a unitary piece of thermally conductive material with dome-shaped support structures 40 being created by deformed regions of flat plate 32. This correspondingly forms a plurality of concavities 44 in bottom surface 34. Each concavity 44 and its respective support structure 40 may be formed by mechanically stamping a disc-shaped production blank so that each concavity 44 forms a hollow interior for its respective support structure 40 with support structure 40 having a thinned frustoconical side wall 46, as is best shown in FIG. 3. Preferably, flat plate 32, when formed of copper, has a thickness between 0.030 and 0.100 inch, inclusive, and support structures 40 are formed so that top faces 42 are located at least 0.050" above upper surface 36 so that the heating vessel is supported in spaced relation to upper surface 36 at least 0.050". Flat plate 32 has a diameter between 3.5 and 4.5 inches, preferably 3.875 inches, depending on the size of the hot plate with which it is to be used.

In the preferred interface plate embodiment, it is also desirable to prevent slippage of interface device 30 when it is positioned on hot plate 20. To this end, it is preferred to provide a layer 50 of adhesive material covering a bottom surface portion of bottom surface 34. Since this adhesive material is to be used on the support surface of the hot plate, it is important that, for a given application, it is necessary that adhesive material 50 be selected to withstand temperatures in excess of the peak temperatures of the support surface of the; hot plate upon which thermal interface plate device 30 will be used. In the embodiment shown in FIGS. 3 and 4, adhesive layer 50 is constructed as a double-sided glass fiber tape, and one such material found suitable for adhesive layer 50 is sold as P212 by the Permacel Tape Company of New Brunswick, N.J., USA. Other materials such as high temperature adhesive films and the like could be used for layer 50, all as is known in the art.

The use of thermal interface plate 30 is best shown, in FIG. 4 wherein interface plate 30 is placed on hot plate 20 and adhered thereto by means of adhesive layer 50. Due to its intimate contact with heat element 20, and the relative thinness of layer 50, interface device 30 may be directly heated by heating element 20. As is shown in FIG. 4, coffee pot 18 has a side wall 26 and a base 28. Top faces 42 are oriented along a geometric surface complimentary to the shape of base 28. It should be seen in FIG. 4 that a convection space 52 is thus created between base 28 and flat plate 32 with only minimal contact between base 28 and flat faces 42. Further, since it is possible that some liquid may inadvertently enter the region between interface device 30 and heating element 20 and to aide convection heating, interface device 30 preferably has a plurality of vent holes 48 formed therethrough with these vent holes 48 preferably being located centrally through top face 42 of each dome-shaped support structure 40. Vent holes 48 allow the venting of steam or other vapors from underneath interface plate 30.

Those skilled in the art will know that two types of hot plates have commonly been provided on drip coffee makers to maintain the brewed coffee at an elevated holding temperature suitable for consumption. A first type of hot plate typically has an operating temperature of 220° to 250° F., inclusive, and normally holds brewed coffee in a coffee pot at a holding temperature in excess of 170° F. A second type of hot plate has a cyclical heating element which cycles between an "on" state having a maximum temperature in excess of 250° F. and an "off" state having a minimum temperature defined by the heat dissipation characteristics of the hot plate.

In each of these cases, brewed coffee being held for consumption in coffee pot 18 normally is subjected to degradation. For example, with respect to a constant temperature heating element, localized hot spots are found on such plates wherein these hot spots may have temperatures in excess of 300° F. even though the overall average temperature for the heating element is much less. That portion of coffee pot base 28 in contact with these hot spots accordingly becomes excessively heated and causes localized burning or scorching of the brewed coffee adjacent thereto. This causes degradation of the brewed coffee over time since an increasing percentage of coffee becomes burned or scorched. Indeed, experience has shown, that in these localized regions, boiling of the brewed coffee may be observed. With respect to cyclical heating elements, a large portion of the surface area of the hot plate becomes excessively heated causing intermittent burning or scorching of coffee and degradation of the brewed liquid.

Thermal interface plate 30 embodying the present invention eliminates localized and excessive heating effects by preventing direct contact between base 28 of coffee pot 18 and the support surface of hot plate 20. Spacing base 28 from the surface of the heating element provides a convection space 52, and base 28 thus experiences reduced heating from thermal conduction. Instead, base 28, as well as the brewed coffee contained in coffee pot 18, is subjected to heating from hot air convection currents through convection space 52 as well as infrared heating at wavelengths according to the well-known Wien's Displacement Law $\lambda_m T = b$ (T expressed in degrees Kelvin; b=0.28978 cmK).

With respect to hot plates having cyclical heating elements, the thermal interface plate embodying the present invention provides a thermal mass operative to dampen the cyclical effect of the heating so as to store heat generated when the cyclical heating element is in its "on" state and discharge such heat both during the "on" and "off" states as convection heat and infrared radiation to the coffee stored in coffee pot 18. The interface plate thus dampens the amplitude of the maximum temperature and avoids burning of the brewed coffee when the heating element is in the "on" state.

Figure 5:
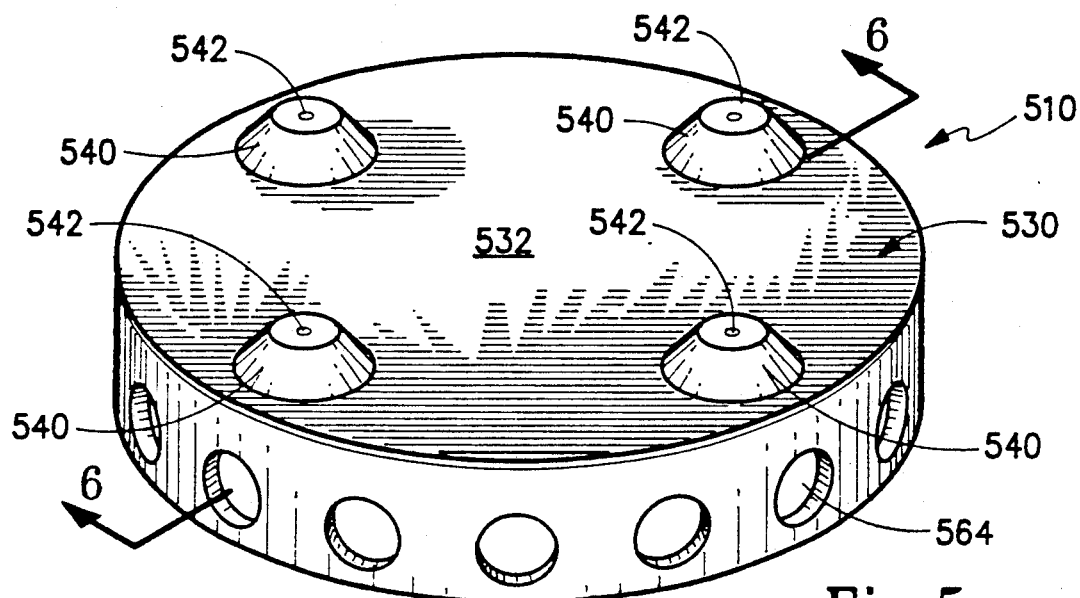
FIG. 5 is a perspective view of a heating unit for a drip coffee maker embodying the present invention.
Figure 6:
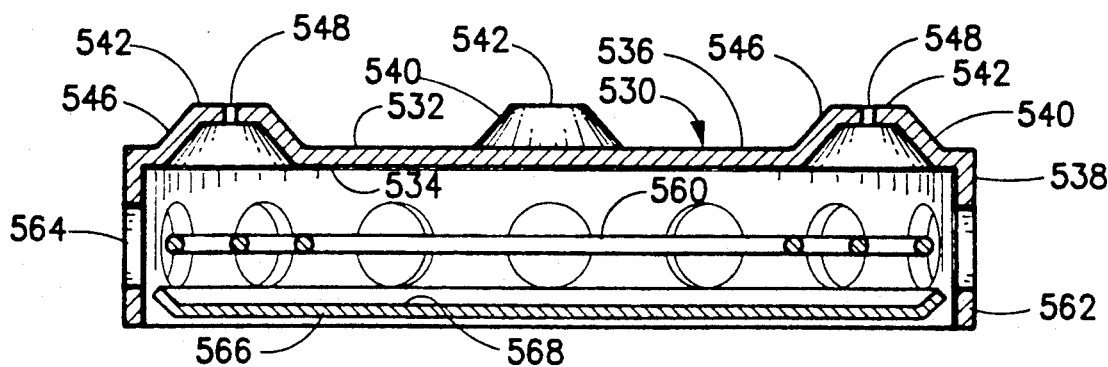
FIG. 6 is a cross-section view of the heating unit of FIG. 5 taken at line VI—VI.

A warming unit 510 embodying the present invention and intended for use as a hot plate on a coffee brewing machine is shown in perspective FIG. 5 and in a section view, taken at line VI—VI in FIG. 5, in FIG. 6. Warming unit 510 includes a top panel 530 formed of a flat plate 532 of heat conductive material which is dimensioned to support a base of a coffee pot. As in the case of interface plate 30 discussed above, top panel 530 may be formed of an integral piece of material 532, such as copper. Flat plate 532 has a bottom surface 534 facing a heating element 560. An upper surface 536 is located opposite bottom surface 534 and faces a base of a coffee pot when a coffee pot is set on top panel 530. As may best be seen in FIG. 6, raised surface support means are located on the upper surface 536 of top panel 530 to support a coffee pot thereon. In the preferred embodiment of FIGS. 5 and 6, the raised support means include a plurality of dome shaped support structures 540 which are preferably frustoconical in shape and have a flat top surface 542. As with interface plate 30, in the preferred embodiment of the warming unit of FIGS. 5 and 6, four such support structures are provided and are located equally around and spaced from a peripheral edge 538 of top panel 532. As may best be seen in FIG. 6, in the preferred embodiment, support structures 540 and top plate 532 are formed as a unitary piece of thermally conductive material with dome shaped support structures 540 created by deformed regions of top plate 532. Thus, as may best be seen in FIG. 6, support structures 540 correspond with a plurality of concavities 544 in bottom surface 534 of top panel 532.

In the preferred embodiment of FIGS. 5 and 6, perimeter skirt 562 extends downwardly from the perimeter 538 of top plate 532 and surrounds heating element 560. Heating element 560 may be an electric heating element or any other suitable heat source. Perimeter skirt 562 may be formed integrally with top plate 532 as, for example, by a stamping or casting process, or may be fabricated separately from top plate 532 attached to perimeter 538 of top plate 532, for example, by welding. Top plate 532 and side skirt 562 are preferably both formed of thermally conductive materials and have a suitably large specific heat capacity. Top plate 532 may be provided with vent holes 548 preferably located centrally through top faces 542 of each of dome shapes support structures 540. Vent holes 548 allow the venting of steam or other vapors which may accumulate underneath top plate 530 and promote upward connective flow of air about a vessel to be warmed. Perimeter skirt 562 may be provided with perimeter skirt vent holes 564 which assist not only of the venting of vapors which may accumulate beneath top plate 532 but also allow conductive currents to pass from beneath top plate 532 through vent holes 564 about the perimeter 538 of top plate 532 to flow upwardly past the walls of a coffee pot resting upon warming unit 510 to contribute to the uniform convective warming of the vessel and its contents. Heating element 560 may be any of well known electrical or other heating elements which have an on state in which heating element 560 generates heat energy and an off state. Heating element 560 may cycle alternately between those states. The state of heating element 560 may be determined by a timing device, or heating element 560 may be linked to a thermostatic control which determines the state of heating element 560 in accordance with a temperature as determined by the thermostat.

As in the case with thermal interface plate 30 support structures 540 of top panel 530 prevent direct contact between the base of a coffee pot and surface 536 of top panel 530 to provide even heating of the coffee pot base. Further, the high specific heat of top panel 532 and perimeter skirt 538 each provide thermal damping to create a heat source mass of relatively constant temperature during cycling of heating element 560 in its off and on states. A reflecting plate 566 with reflecting surface 568 may be located beneath heating element 560 to reflect infared heat from element 560 back upon bottom surface 534 of top plate 530.

Figure 7:
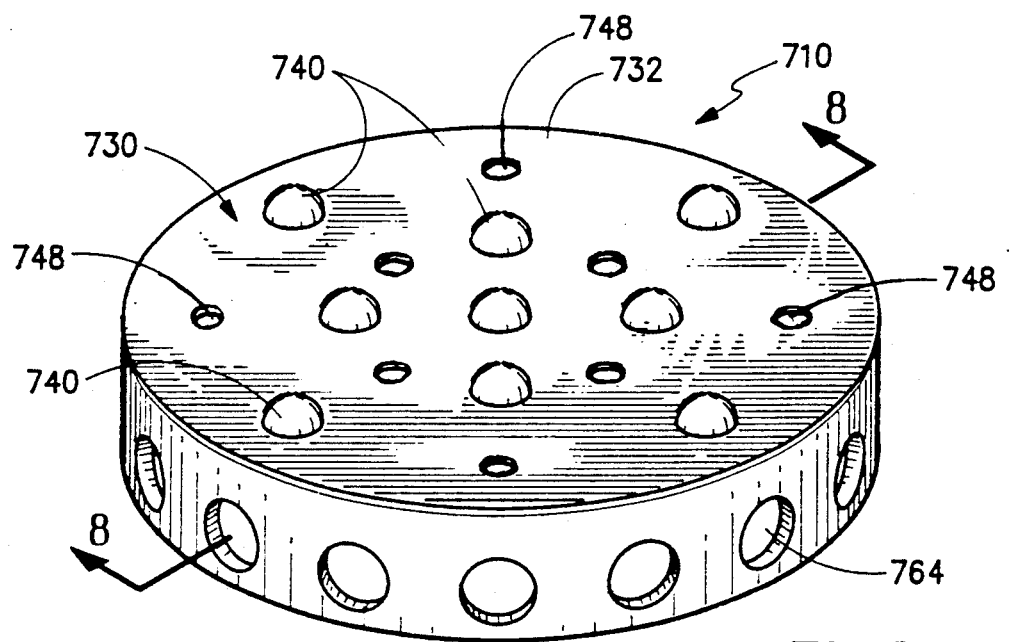
FIG. 7 is a perspective view of a first alternative embodiment of a heating unit for a drip coffee maker comprising the present invention.
Figure 8:
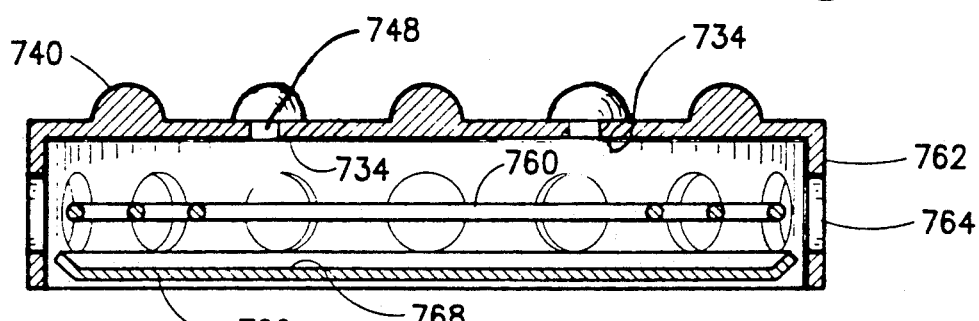
FIG. 8 is a sectional view of the heating unit of FIG. 7 taken at line VIII—VIII.

A first alternative embodiment of a heating unit for a coffee brewing machine 710 embodying the present invention is shown in FIGS. 7 and 8 wherein a top panel 730 is formed as a flat plate 732 of heat conductive material which has a bottom surface 734 and an upper surface 736. In the illustrated embodiment, top panel 730 again is a circular and has a peripheral edge 738 from which a perimeter skirt 762 extends downwardly to surround a heating element 760. A plurality of dome-shaped support structures 740 are located on upper surface 736 of top panel 732. As shown in FIG. 7, nine such dome-shaped structures 740 are provided.

In heating unit embodiment 710 of in FIGS. 7 and 8, the construction of each dome-shaped structure 740 is different from dome structures 540 of the embodiment of FIGS. 5 and 6 in that each is constructed as a solid hemi-spherical mass formed integrally with top plate 632. In this construction, it is convenient that heating unit top panel 730 and skirt 762 be constructed as a single cast unit of copper or other material of suitable conductivity and heat capacity. The top portion of each support structure 640 is thus rounded instead of flattened and no concavity, corresponding to cavity 544 of heating unit 510, is provided in embodiment of heat unit 710 of FIGS. 7 and 8. Furthermore, a plurality of vent holes 748 are provided directly through a flat plate portion of top plate 730, vent holes 748 not being located through respective dome-shaped structures 740.

Again, perimeter skirt 762 may be provided with holes 764 to facilitate convective warming of the sides of a coffee pot or other vessel. Further, a reflective plate 776 with an upper heat reflective surface 778 may be positioned beneath heating element 760 to reflect radiated heat produced by heating element 760 back toward bottom surface 734 of top plate 730.

A third warming unit 910 embodying the present invention is illustrated in FIG. 9. The hot plate 910 of FIG. 9 is similar in structure to hot plates 510 and 710 of FIGS. 5 and 7 respectively with the addition of a bottom plate 970 which is joined at its perimeter with a bottom edge of skirt 962 to create a chamber 972 which is filled with a heat conductive material of suitably high specific heat which surrounds heating element 960.

Figure 9A:
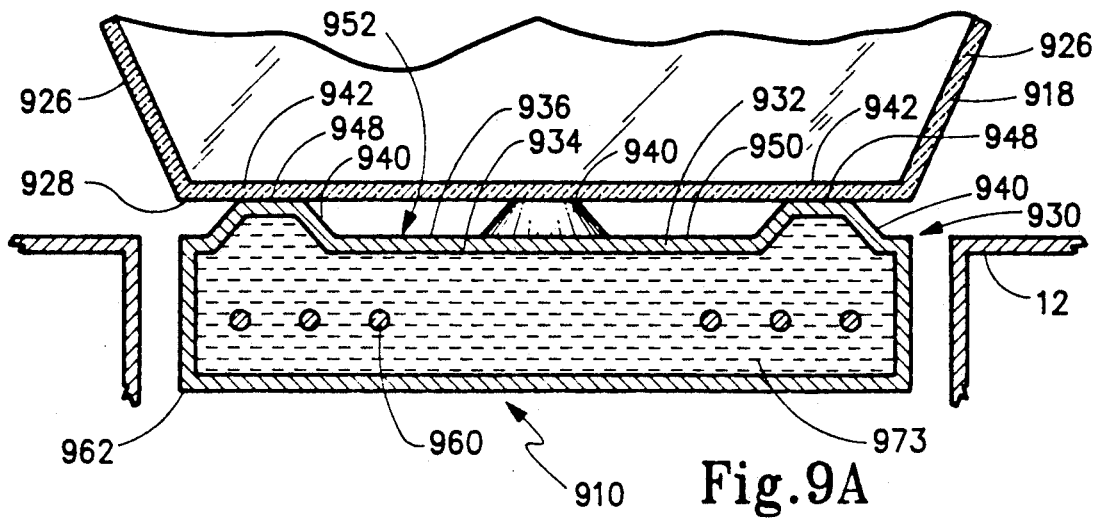
FIG. 9 is a section view of a third alternative heating unit for a drip coffee maker comprising the present invention.
Figure 9B:
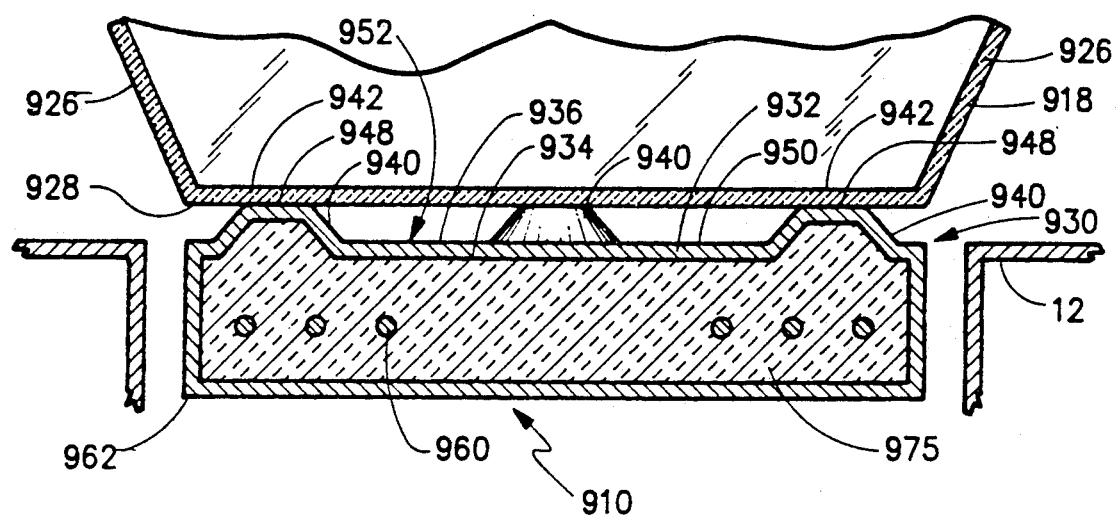

Chamber 972 may be filled with a liquid 973 is shown in FIG. 9(a) or a solid 975 as shown in FIG. 9(b), possibly in particulate form, which provides heat capacity in addition to top plate 930 to assist in providing a relatively constant temperature heat source during the cycling of heat element 960 between the off and on state. It should be noted that the material utilized to fill chamber 972 must be of a sufficiently high boiling point and low vapor pressure that, when subjected to highest temperature of heat element 960 during the on state of its heating cycles the material does not develop sufficient pressure within chamber 972 to distort or rupture the chamber.

Figure 10:
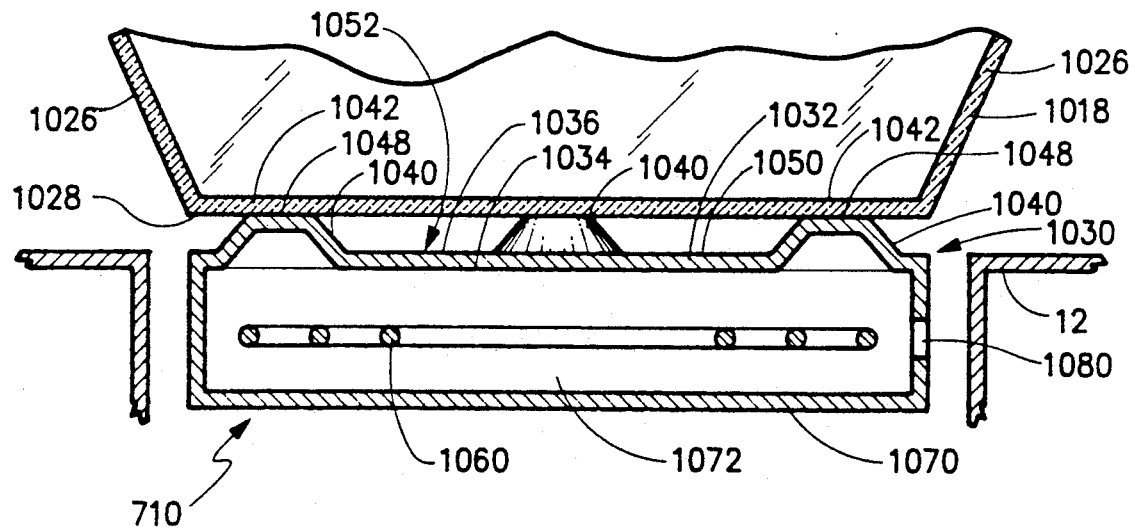
FIG. 10 is a section view of a fourth alternative heating unit for a drip coffee maker comprising the present invention.

Another warming unit 1010 comprising the present invention is shown in FIG. 10. Warming unit 1010 is substantially similar to the embodiment of FIG. 9, except that chamber 1072 contains only air and is vented to the ambient atmosphere through aperture 1080.

Accordingly, the present invention has been described with some degree of particularity directed to the preferred embodiments comprising the present invention. It should be appreciated, though, that the present invention is defined by the following claims construed in light of the prior art so that modifications or changes may be made to the preferred embodiment of the present invention without departing from the inventive concepts contained herein.

I claim:

1. A warming unit for warming a vessel comprising:
    a heating element having an on state in which said element produces heat energy and an off state;
    a top panel fabricated of heat conducting material and including an upper surface and a bottom surface opposite said upper surface, said bottom surface facing said heating element, said top panel having a thermal mass and operative to store heat when the element is in the on state and discharge heat both when the element is in the on state and when the element is in the off state thereby dampening an amplitude of maximum temperatures, and
    raised surface support means located on said upper surface for supporting a vessel in spaced relation to said upper surface.

2. A warming unit as in claim 1 wherein said raised surface support means includes a plurality of dome shaped support structures.

3. A warming unit as in claim 2 wherein said domed shaped support structures are deformed regions of said top panel whereby each dome shaped support structure has a corresponding concavity in said bottom surface.

4. A warming unit as in claim 3, further comprising:
    a thermostat to switch said element between the on state and off state in response to a temperature change thereby cycling said element between a maximum and a minimum temperature.

5. A warming unit as in claim 1 wherein said top panel has a plurality of vent holes formed therethrough.

6. A warming unit as in claim 1 in which said top panel has a perimeter and a skirt extending downwardly from said perimeter.

7. A warming unit as in claim 6 in which said skirt has a plurality of vent holes formed therethrough.

8. A warming unit as in claim 6 further comprising a bottom panel having a bottom panel perimeter, said bottom panel joined to a bottom edge of said skirt at said bottom panel perimeter so that said top panel, said bottom panel and said skirt together enclose a chamber and said heating element is located within said chamber.

9. A warming unit as in claim 8 in which a vent hole communicates said chamber with an ambient atmosphere.

10. A warming unit as in claim 8 further comprising a heat conductive material contained within said chamber.

11. A warming unit as in claim 10 in which said heat conductive material is a liquid.

12. A warming unit as in claim 10 in which said heat conductive material is a solid.

13. A warming unit as in claim 12 in which said heat material is conductive particulate.

14. A hot plate for a coffee brewing machine comprising:
    a heating element for producing heat energy;
    a support panel above said heating element including a bottom surface facing said element and a generally horizontal, upper surface opposite said bottom surface;
    support means for supporting the base of a food vessel in set apart relation to said surface, and
    a thermal mass imposed between said heating element and said upper surface.

15. A warming unit as in claim 13, further comprising:
    thermostat means for controlling the cycling of said heating element in response to a temperature.

16. A hot plate as in claim 14 in which said thermal mass is integral with said support panel.

17. A hot plate as in claim 16 in which said support means comprises a plurality of dome shaped support structures.

18. A hot plate as in claim 17 in which said dome shaped support structures comrpise deformed regions of said upper surface of said support panel.

19. A hot plate as in claim 18 in which said support panel has a plurality of vent holes formed therethrough.

20. A hot plate as in claim 19 in which said support panel comprises a skirt extending downwardly from a perimeter of said support panel.

21. A hot plate as in claim 20 in which said skirt has a plurality of vent holes formed therethrough.

22. A hot plate as in claim 21 in which said skirt surrounds said heating element.

23. A hot plate as in claim 14 in which said heating element has an on condition in which said heating element produces heat energy and an off condition said element cycling between the off condition and the on condition thereby cycling between a maximum and a minimum temperature.

24. A hot plate as in claim 23 further comprising:
    a reflection plate, said reflection plate generally planar and lying parallel to said support panel and to a side of said heating element opposite said top panel and having a heat reflective surface facing said heating element.

25. In a coffee maker including a coffee brewing unit for heating water to a coffee brewing temperature and conveying the water through a coffee holding filter assembly wherein the water becomes flavored by coffee and thereafter dispensing the coffee flavored water into a receiving vessel and further including a hot plate, the hot plate having a support panel for supporting the vessel, and a cyclical heating element cycling between an on state during which the element attains a maximum temperature in excess of 250° and an off state having a minimum temperature an improvement for minimizing degradation of coffee within the vessel, the improvement comprising:

said support panel is fabricated of a heat conducting material and includes an upper surface and a bottom surface opposite said upper surface the bottom surface facing said heating element, said upper surface comprises raised surface support means for supporting the vessel in spaced relation to said upper surface whereby said vessel is heated primarily by convection currents and infared radiation, said support panel includes a thermal mass operative to store heat when the heating element is in the on state of the heating cycle and discharge heat both when the element is in the on and off states of the heating cycle thereby damping an amplitude of maximum temperatures.

* * * * *